United States Patent Office 3,849,579
Patented Nov. 19, 1974

3,849,579
PROCESS FOR REDUCING PICKLE BLOATING WITH DEHYDROACETIC ACID
Richard C. Hall, Cleveland, Norman D. Kidd, Middleburg Heights, and George V. Daravingas, Lakewood, Ohio, assignors to SCM Corporation, Cleveland, Ohio
No Drawing. Filed Oct. 3, 1972, Ser. No. 294,722
Int. Cl. A23b 7/10
U.S. Cl. 426—49                                       3 Claims

ABSTRACT OF THE DISCLOSURE

In a process for the brine curing of cucumbers with salt to make pickle products, the improvement comprising using dehydroacetic acid as a processing additive in a sufficient amount to reduce pickle bloating while maintaining yeast growth.

---

This invention relates to an improvement in reducing the amount of spoilage in pickle brining processes. More specifically, this invention relates to a process and composition for reducing cucumber bloating during the brine cure of cucumbers. Cucumbers are typically converted to pickle products by brine-curing which is defined hereinafter in the specification as treating cucumbers with salt and/or salt solutions to cure the cucumber by natural bacteriological fermentation processes. Micro-organisms cause fermentation during the brining process. These micro-organisms essentially come from the cucumbers, their adhering particles of soil, the tanks themselves, and the brine. The growth of micro-organisms during fermentation produces primarily lactic and acetic acids, alcohols, and gases, such as carbon dioxide. The gas from these micro-organisms enters or is entrapped by the cucumbers causing bloating of the cucumbers which results in defective pickles. Bloating is defined hereinafter in the specification to mean the formation or entrapment of gases or liquids in the cavities or skins of the cucumber from micro-organisms during the brining process. Bloatings are of two types—one type being the lens type wherein gas pockets are formed in the individual cucumber seed carpels and are roughly lens shaped. In a balloon-type bloater, the carpels of the cucumber separate because of internal gas pressure and are pressed flat toward the skin leaving a gas-filled or liquid cavity. Bloating results in up to 75 percent of the cucumber stock being spoiled during the brining cure. There has been a long-felt need by pickle manufacturers to reduce bloating during the brining cure. Prior attempts to reduce bloating have been ineffective.

Applicants have discovered that bloating during the brining of cucumber products to produce pickle products can be substantially reduced while maintaining the growth of desirable micro-organisms during the natural fermentation when brining takes place with the use of dehydroacetic acid as a processing additive.

Another aspect of the invention is that dehydroacetic acid in the brining process was found to be more efficient than typical, expensive additive mycostatic agents, such as potassium sorbate. Dehydroacetic acid is effective in reducing bloating in neutral to acid brine conditions.

Potassium sorbate is effective only in acid conditions and requires time for the bacteria to produce enough acid to lower the brine pH enough to permit the sorbate's mycostatic action. During this time, the yeast is producing gases resulting in irreversible defects in the pickles since the yeast can multiply unrestrictedly.

Dehydroacetic acid was found not to contaminate the walls of the pickling tanks with dehydroacetic yeast resistant strain. Hence, when dehydroacetic acid is used, the pickling tanks can be reused without contaminating the walls of the containers which resulted in further spoilage.

Dehydroacetic acid at low levels does not hinder yeast growth, but merely suppresses their gas production which causes pickle bloating. Potassium sorbate suppresses yeast growth to reduce bloating. Dehydroacetic acid is less expensive than potassium sorbate and only a minor amount relative to potassium sorbate is needed, resulting in less cost. Another advantage of dehydroacetic acid is that it is odorless and tasteless. Applicants also discovered that low levels of caprylic acid reduced bloating, but resulted in the pickles having an off taste.

In a typical brining process, fresh green cucumbers are added to a large container, tank, or vat wherein they are brined with salt. The amount of salt or salt solution varies and is measured in terms of brine salinity which is defined as degrees salometer as measured by a hydrometer calibrated in percent of saturation with respect to sodium chloride (0 to 100 percent sal.). Degrees salometer are converted to approximate equivalent in percent of salt by weight; for example, 20°, 30°, and 40° sal. brines would approximate brines with 5, 8, and 10 percent of salt. Typically, the amount of cucumbers put into a container ranges from 200 to 2,000 bushels and a salt brine of suitable concentration is added to the brining container. Concentration of the salt added initially usually ranges from 6 to 12 percent and is increased gradually to 10 to 15 percent at the end of four to six weeks. Brining tanks are outdoors exposed to sunlight; hence the temperature of the brine cure process varies depending on locality and upon the time of the year. In the North a lower amount of cucumbers are added to the container vats and the salting method usually consists of a combination of dry salting and brine solution.

The initial salt concentration is about 6 to 7.5 percent and is not raised according to any set standard, but is dependent on temperature conditions and the acid fermentation. Further details on conventional brine curing of cucumbers is found in "Advances in Cucumber Pickling," *Yearbook of Agriculture* (1950–1951), by John L. Etchells, Ivan D. Jones, and Thomas Bell, the entire publication of which is hereby incorporated by reference. During brining, most of the micro-organisms that cause fermentation come from the cucumber and adhering particles of soil. During the natural fermentation of cucumbers for salt stock, the following salt tolerant microbial groups are present; acid-forming bacteria (Lactobacillus, Pediococcus), yeast, coliform bacteria, and other halophic bacteria and bacteria of lesser importance. As a result of the growth of these organisms, lactic acid, acetic acid, and gases are produced which can result in high pickle bloating. Applicants have discovered that when dehydroacetic acid was added to the brine solution, pickle bloating was substantially reduced. Dehydroacetic acid reduces the amount of gas formation by the yeast while not retarding the yeast growth. Further details on yeast and bacterial growth is described in "Advances in Cucumber Pickling," pages 9–11 (supra).

The fact that dehydroacetic acid is effective at stopping gas production by the yeast and does not stop its growth, removes the possibility of dehydroacetic acid resistant yeast strains being selected in the tanks which can then act as dehydroacetic resistant yeast cultures which can become an inoculum for future cucumber stock in that particular tank.

Dehydroacetic acid is 3 - acetyl - 6 - methyl - 1,2-pyran - 2,4(3H) - dione, otherwise known as methylacetopyronone. The dehydroacetic acid can be added initially to the salt brine or after the cucumbers are added. The amount of dehydroacetic acid used ranges from about 0.005 percent to 0.50 percent based on total volume of the brine solution and cucumbers. Good results were obtained when 0.005 percent to 0.025 percent was used. Preferred amount is 0.015 percent. Water-soluble salts of dehydroacetic acid can also be used, such as sodium dehydroacetic acid or potassium dehydroacetic acid.

Dehydroacetic acid was also found to be effective when employed alone or with other mycostatic agents, such as potassium sorbate, sodium benzoate, and caprylic acid, when added to the cushion brine. Optionally, fermentation stimulators can also be added to brine such as yeast extract and mannitol.

Once the cucumbers are salt brined, cured, and have been treated with dehydroacetic acid, various finished pickle products are made from completely cured salt stock (cucumbers) by leaching out the salt, souring with vinegar, or sweetening with sugar.

The following examples show ways in which our invention has been practiced, but should not be construed as limiting the invention. In this application all temperatures are in degrees Fahrenheit and all parts are parts by weight unless otherwise specified.

EXAMPLE 1

A 45-gallon pickling drum was thoroughly washed with water and lime, and rinsed. One foot of 44° salometer cushion brine was added to the pickling drum and 25.5 grams of dehydroacetic acid added. 527 grade No. 8 size (large) cucumbers were put into the drum and the drum was then filled with brine to cover the cucumbers. This resulted in (0.015 percent) dehydroacetic acid by volume of the brine solution and cucumbers. When the lactic acid concentration of the drum reached 0.7 percent, adjusted to 50° percent salometer with dry salt, raising it by 2° percent salometer per day. After 4 months, the pickles were removed and tested for the amount of bloating.

The amount of bloating was determined by slicing the pickles and measuring the length and type of the defects (gaseous hollow portions). The pickles were classified into those having defects of over 20 percent of the longitudinal length of the pickle and those having less than 20 percent. The results indicated that only 11.4 percent of the 527 pickles tested had defects over 20 percent and 5.1 percent of the 527 pickles tested had defects under 20 percent.

The amount of Lens defect was 9.3 percent. Honeycomb defect was 9.3 percent (see Table I). Honeycomb defect is defined as when the center of the pickle becomes soft and mushy from a series of lens defects. Pickles having serious defects have to be used to produce less valuable products, such as relish; hence a loss in quality pickle stock is realized.

EXAMPLES 2-8

For control purposes, pickles were treated in Examples 2-8 in the same procedure as in Example 1, except that in Examples 2 and 7, no dehydroacetic acid was added. In Examples 3, 4, 5, and 6 the amount of dehydroacetic acid varied from .005, 0.01, 0.02, and 0.025 percent, respectively. In Example 8, 0.03 percent of potassium sorbate was added instead of dehydroacetic acid. The results are shown in Table I.

EXAMPLE 9

The same procedures were followed as in Example 1, except that 0.01 percent caprylic acid was used instead of dehydroacetic acid and 0.1 percent yeast extract (fermentation stimulator) was added. The amount of defects over 20 percent decreased from 16 percent to 8.5 percent.

SUMMARY OF TABLE I

The results of Table I showed that when no mycostatic agent was added, 45.6 percent of the pickles had defects of over 20 percent in length. When .005 percent dehydroacetic acid was added to the pickling drum, the percent of defects over 20 percent decreased to 33.9 percent. When 0.10 percent dehydroacetic acid was employed, the amount of defects over 20 percent decreased to 13.5 percent. When 0.015 percent dehydroacetic acid was added, the amount of defects over 20 percent decreased to 11.4 percent. When .020 percent dehydroacetic acid was added, the defects of over 20 percent were decreased to 17.1 percent. When potassium sorbate was used, defects under 20 percent were raised to 20.0 percent, but defects over 20 percent remained over 45 percent. (Add under 20 percent defects). Neither dehydroacetic acid nor potassium sorbate had a significant effect on honeycomb defect or lens defect.

TABLE I

| Example | Drum | Pickle stock | DHA, percent | Sorbate, percent | Defects Over 20% | Under 20% | Lens, percent | Honeycomb, percent | Total, percent | Number checked |
|---|---|---|---|---|---|---|---|---|---|---|
| 1 | 1 | RG 8 | 0.015 | 0.000 | 11.4 | 5.1 | 9.3 | 9.3 | 35.1 | 527 |
| 2 | 2 | RG 8 | 0.000 | 0.000 | 45.6 | 8.6 | 8.2 | 5.8 | 68.2 | 502 |
| 3 | 3 | RG 8 | 0.005 | 0.000 | 33.9 | 9.3 | 5.2 | 7.1 | 55.5 | 496 |
| 4 | 4 | RG 8 | 0.010 | 0.000 | 13.5 | 5.4 | 5.6 | 4.0 | 28.5 | 496 |
| 5 | 5 | RG 8 | 0.020 | 0.000 | 17.1 | 21.8 | 1.8 | 1.0 | 41.7 | 510 |
| 6 | 6 | RG 8 | 0.025 | 0.000 | 15.9 | 13.6 | 2.3 | 2.1 | 33.9 | 515 |
| 7 | 7 | RG 8 | 0.000 | 0.000 | 50.8 | 15.2 | 7.7 | 12.2 | 85.9 | 533 |
| 8 | 8 | RG 8 | 0.000 | 0.03 | 48.2 | 20.0 | 7.3 | 7.3 | 82.8 | 519 |

Having thus described the invention, what is claimed is:

1. In a process for curing cucumbers in brine by natural bacteriological fermentation, wherein the improvement comprises:
   the inclusion of 0.005% to 0.5% volume of dehydroacetic acid in the brine solution based on the total volume of brine solution and cucumbers to prevent gas and bloating of said cucumber.

2. The process in class 1 wherein said dehydroacetic acid is derived from a water-soluble salt of dehydroacetic acid.

3. The process of claim 2 wherein the salt is selected from sodium dehydroacetic acid and potassium dehydroacetic acid.

References Cited

UNITED STATES PATENTS

| 2,722,483 | 11/1955 | Winkler | 99—224 |
| 3,743,519 | 7/1973 | Haas | 99—2 R |
| 2,857,282 | 10/1958 | Jansen | 99—156 |
| 3,038,810 | 6/1962 | Akerboom et al. | 99—156 |
| 3,255,019 | 6/1966 | Engelland | 99—222 |

OTHER REFERENCES

J. L. Etchells et al., "Influence of Sorbic Acid on Populations and Species of Yeasts Occurring in Cucumber Fermentations, June 15, 1960.

C. S. Pederson et al., Chemical Abstracts, vol. 61, 15267(a), 1964.

T. Ogawa et al., Chemical Abstracts, vol. 59, 15853g, 1961.

NORMAN YUDKOFF, Primary Examiner

C. P. RIBANDO, Assistant Examiner

U.S. Cl. X.R.

426—9